US012755564B2

(12) United States Patent
Peng et al.

(10) Patent No.: US 12,755,564 B2
(45) Date of Patent: Oct. 6, 2026

(54) SEAT BELT WEARING DETECTION METHOD, ELECTRONIC DEVICE AND STORAGE MEDIUM

(71) Applicants: Chengdu BOE Smart Technology CO., LTD., Chengdu (CN); BOE TECHNOLOGY GROUP CO., LTD., Beijing (CN)

(72) Inventors: Yuzhou Peng, Beijing (CN); Ronghua Lan, Beijing (CN)

(73) Assignees: Chengdu BOE Smart Technology CO., LTD., Chengdu (CN); BOE TECHNOLOGY GROUP CO., LTD., Beijing (CN)

(*) Notice: Subject to any disclaimer, the term of this patent is extended or adjusted under 35 U.S.C. 154(b) by 173 days.

(21) Appl. No.: 18/563,625

(22) PCT Filed: Dec. 16, 2022

(86) PCT No.: PCT/CN2022/139613

§ 371 (c)(1),
(2) Date: Jan. 28, 2025

(87) PCT Pub. No.: WO2024/124536

PCT Pub. Date: Jun. 20, 2024

(65) Prior Publication Data

US 2025/0182500 A1 Jun. 5, 2025

(51) Int. Cl.
*G06V 20/59* (2022.01)
*G06T 3/02* (2024.01)
(Continued)

(52) U.S. Cl.
CPC .............. *G06V 20/593* (2022.01); *G06T 3/02* (2024.01); *G06T 7/11* (2017.01); *G06T 7/60* (2013.01);
(Continued)

(58) Field of Classification Search
None
See application file for complete search history.

(56) References Cited

U.S. PATENT DOCUMENTS

2016/0078306 A1* 3/2016 Artan .................. G06V 10/764
382/104
2020/0231109 A1 7/2020 Baltaxe et al.
(Continued)

FOREIGN PATENT DOCUMENTS

CN 102717773 A 10/2012
CN 103552538 A 2/2014
(Continued)

OTHER PUBLICATIONS

Extended European Search Report in corresponding EP Application No. 22968242.2, dated Apr. 7, 2025, in 7 pgs.
(Continued)

*Primary Examiner* — Eileen M Adams
(74) *Attorney, Agent, or Firm* — Dority & Manning, P.A.

(57) ABSTRACT

A seat belt wearing detection method includes: performing face detection on an image to be detected to obtain position information of one or more face detection boxes; recognizing a target face detection box located in a preset seat region from the one or more face detection boxes based on the position information of the one or more face detection boxes; cropping the image to be detected to obtain a target human body image corresponding to the target face detection box based on position information of the target face detection box; segmenting the target human body image to obtain a seat belt region image; and determining whether a person corresponding to the target human body image wears a seat belt based on the seat belt region image.

19 Claims, 8 Drawing Sheets

(51) Int. Cl.

| | |
|---|---|
| ***G06T 7/11*** | (2017.01) |
| ***G06T 7/60*** | (2017.01) |
| ***G06V 10/24*** | (2022.01) |
| ***G06V 10/26*** | (2022.01) |
| ***G06V 10/75*** | (2022.01) |
| ***G06V 40/16*** | (2022.01) |

(52) U.S. Cl.

CPC ............ *G06V 10/247* (2022.01); *G06V 10/26* (2022.01); *G06V 10/751* (2022.01); *G06V 40/162* (2022.01); *G06T 2207/20132* (2013.01); *G06T 2207/30201* (2013.01); *G06T 2207/30268* (2013.01); *G06V 2201/07* (2022.01)

(56) References Cited

U.S. PATENT DOCUMENTS

| | | | |
|---|---|---|---|
| 2021/0206344 A1 | 7/2021 | George et al. | |
| 2021/0209385 A1 | 7/2021 | Wang et al. | |
| 2022/0144206 A1 | 5/2022 | Wang et al. | |
| 2023/0017759 A1 | 1/2023 | Zeng et al. | |
| 2023/0020385 A1 | 1/2023 | Zeng et al. | |
| 2024/0029452 A1* | 1/2024 | Cho | G06V 20/59 |
| 2024/0062557 A1 | 2/2024 | Zhang et al. | |

FOREIGN PATENT DOCUMENTS

| | | | |
|---|---|---|---|
| CN | 104182960 | A | 12/2014 |
| CN | 104417489 | A | 3/2015 |
| CN | 104417490 | A | 3/2015 |
| CN | 105117696 | A | 12/2015 |
| CN | 105216746 | A | 1/2016 |
| CN | 105774750 | A | 7/2016 |
| CN | 107330367 | A | 11/2017 |
| CN | 109460699 | A | 3/2019 |
| CN | 110084184 | A | 8/2019 |
| CN | 110569732 | A | 12/2019 |
| CN | 106709443 | B | 6/2020 |
| CN | 111476224 | A | 7/2020 |
| CN | 111582077 | A | 8/2020 |
| CN | 113269005 | A | 8/2021 |
| JP | 2019069725 | A | 5/2019 |
| WO | WO 2022/135589 | A1 | 6/2022 |

OTHER PUBLICATIONS

Huo Xing et al., "Application of Deep Learning in Driver's Safety Belt Detection", Computer Science, vol. 46, No. 6A, China, Jun. 2019, 21 pages.

Kashevnik et al., "Seat Belt Fastness Detection Based on Image Analysis from Vehicle In-Cabin Camera", Proceeding of the 26th Conference of Fruct Association, Russia, 8 pages.

Wang Qianjin et al., "Research and Design of Early Warning System for Dangerous Driving Based on Computer Vision", Academic Journal, Journal of Changsha University, vol. 32, No. 5, Huaihai Institute of Technology, China, Sep. 2018, 10 pages.

Zhang Tao, "Summary of Methods for Identifying Drivers' seat Belts: Seat Belt Identification", No. 4, 3.2, p. 169.

Z. Yang et al., "A new method of vision-based seat belt detection", Int. J. Embedded Systems, vol. 11, No. 6, 2019, pp. 755-763.

* cited by examiner

SEAT BELT WEARING DETECTION METHOD, ELECTRONIC DEVICE AND STORAGE MEDIUM

CROSS-REFERENCE TO RELATED APPLICATION

The present application is a national phase entry under 35 USC 371 of International Patent Application No. PCT/CN2022/139613, filed on Dec. 16, 2022, which is incorporated herein by reference in its entirety.

TECHNICAL FIELD

The present disclosure relates to the field of data processing technologies, and in particular, to a seat belt wearing detection method, an electronic device and a storage medium.

BACKGROUND

With the rapid growth of urban economy and the acceleration of urbanization, traffic safety has become a major problem in the field of urban transportation in countries. In order to ensure safe driving as much as possible and reduce the casualty rate in traffic accidents, people in vehicles are required to wear seat belts. However, in the actual driving process of the vehicle, there may be situations where people in the vehicle forget to wear seat belts, or deliberately do not wear seat belts, which will bring great safety hazards. Therefore, how to effectively detect the wearing situation of the seat belt is a technical problem that needs to be solved urgently at present.

SUMMARY

In an aspect, a seat belt wearing detection method is provided. The method includes: performing face detection on an image to be detected to obtain position information of one or more face detection boxes; recognizing a target face detection box located in a preset seat region from the one or more face detection boxes based on the position information of the one or more face detection boxes; cropping the image to be detected to obtain a target human body image corresponding to the target face detection box based on position information of the target face detection box; segmenting the target human body image to obtain a seat belt region image; and determining whether a person corresponding to the target human body image wears a seat belt based on the seat belt region image.

In some embodiments, recognizing the target face detection box located in the preset seat region from the one or more face detection boxes based on the position information of the one or more face detection boxes, includes: determining, for each face detection box in the one or more face detection boxes, an overlap degree between the face detection box and the preset seat region based on position information of the face detection box and position information of the preset seat region; and determining the face detection box as the target face detection box in a case where the overlap degree between the face detection box and the preset seat region is greater than a first overlap degree threshold.

In some embodiments, determining whether the person corresponding to the target human body image wears the seat belt based on the seat belt region image, includes: determining an attribute parameter of the seat belt based on the seat belt region image; the attribute parameter of the seat belt including a slope of the seat belt, and the slope of the seat belt being used to indicate an inclination of a straight line obtained after a fitting process is performed on the seat belt region image with respect to a bottom edge of the target human image; and determining the person corresponding to the target human body image wears the seat belt in a case where the attribute parameter of the seat belt satisfies a preset condition; the preset condition including a first preset condition, and the first preset condition including that the slope of the seat belt is within a preset range.

In some embodiments, the method further includes segmenting the target human body image to obtain a human body region image. The attribute parameter of the seat belt further includes at least one of the following: an area of the seat belt region image, an overlap degree between the seat belt region image and the target human body image, and an overlap degree between the seat belt region image and the human body region image.

In some embodiments, the preset condition further includes a second preset condition, and the second preset condition includes at least one of the following: the area of the seat belt region image exceeding a preset area threshold; the overlap degree between the seat belt region image and the target human body image being greater than or equal to a second overlap degree threshold; or the overlap degree between the seat belt region image and the human body region image being greater than or equal to a third overlap degree threshold.

In some embodiments, determining the person corresponding to the target human body image wears the seat belt in the case where the attribute parameter of the seat belt satisfies the preset condition, includes: determining whether the attribute parameter of the seat belt satisfies the first preset condition; in a case where the attribute parameter of the seat belt does not satisfy the first preset condition, determining that the person corresponding to the target human body image does not wear the seat belt; in a case where the attribute parameter of the seat belt satisfies the first preset condition, determining whether the attribute parameter of the seat belt satisfies the second preset condition; in a case where the attribute parameter of the seat belt does not satisfy the second preset condition, determining that the person corresponding to the target human body image does not wear the seat belt; and in a case where the attribute parameter of the seat belt satisfies the second preset condition, determining that the person corresponding to the target human body image wears the seat belt.

In some embodiments, the image to be detected to obtain the target human body image corresponding to the target face detection box based on the position information of the target face detection box, includes: determining a height and width of the target human body image corresponding to the target face detection box based on a height and width of the target face detection box, a ratio of the height of the target human body image to the height of the target face detection box being a preset first ratio, and a ratio of the width of the target face detection box to the width of the target human body image being a preset second ratio; and cropping the image to be detected to obtain the target human body image corresponding to the target face detection box based on the position information of the target face detection box and the height and width of the human body region image.

In some embodiments, the method further includes: acquiring an original image captured by an imaging device disposed inside a vehicle and whose capturing region including the preset seat region; and performing affine transformation on the original image to obtain the image to be detected, wherein the preset seat region is located in the middle of the image to be detected.

In some embodiments, segmenting the target human body image to obtain the seat belt region image, includes: inputting the target human body image into a seat belt wearing detection model to obtain semantic information of each pixel in the target human body image, the semantic information being used to indicate a type of an object corresponding to the pixel; and segmenting the target human body image to obtain the seat belt region image based on the semantic information of each pixel. Performing face detection on the image to be detected to obtain the position information of the one or more face detection boxes, includes: inputting image to be detected into a face detection model to obtain the position information of the one or more face detection boxes.

In yet another aspect, an electronic device is provided. The electronic device includes a processor and a memory for storing instructions executed by the processor. The memory is coupled to the processor. The memory is used to store computer program code, and the computer program code includes computer instructions. When the computer instructions are executed by the processor, causing the electronic device to perform one or more steps in the seat belt wearing detection method according to any of the above embodiments.

In some embodiments, the electronic device further includes an imaging device. The imaging device and one of the processor and memory have a data connection therebetween, and the imaging device is used to capture an original image. The imaging device is disposed inside a vehicle, and a capturing region of the imaging device includes a preset seat region. The processor is further configured to perform affine transformation on the original image to obtain an image to be detected. The preset seat region is located in the middle of the image to be detected.

In some embodiments, the imaging device is disposed at at least one of following locations: A-pillar of a cockpit, an instrument panel, a reading light, a center control display or a central console.

In yet another aspect, a non-transitory computer-readable storage medium is provided. The non-transitory computer-readable storage medium has stored computer program instructions that, when run on a computer (e.g., the electronic device or a seat belt wearing detection apparatus described above), cause the computer to perform one or more steps in the seat belt wearing detection method according to any one of the above embodiments.

In still another aspect, a computer program product is provided. The computer program product includes computer program instructions, and when the computer program instructions are executed on a computer (e.g., an electronic device or a seat belt wearing detection apparatus described above), the computer program instructions causes the computer to perform one or more steps in the seat belt wearing detection method according to any one of the above embodiments.

In still another aspect, a computer program is provided. When the computer program is executed on a computer (e.g., an electronic device or a seat belt wearing detection apparatus described above), the computer program causes the computer to perform one or more steps in the seat belt wearing detection method according to any one of the above embodiments.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely drawings of some embodiments of the present disclosure, and a person of ordinary skill in the art obtains other drawings according to those drawings. In addition, accompanying drawings in the following description may be regarded as schematic diagrams, and are not limitations on an actual size of a product, an actual process of a method and an actual timing of signals involved in the embodiments of the present disclosure.

DETAILED DESCRIPTION

Figure 1:
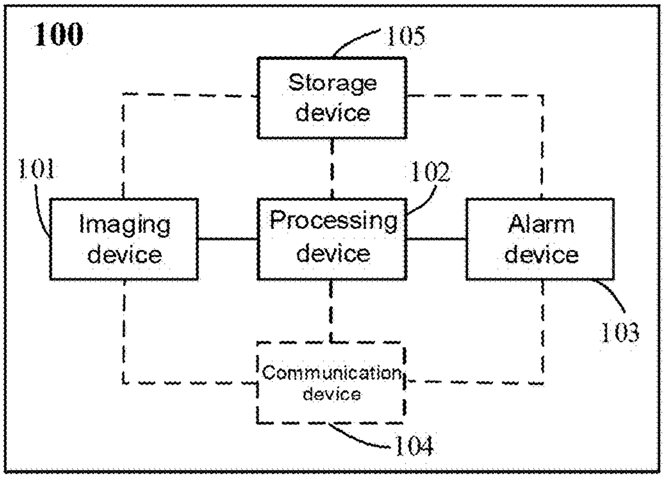
FIG. 1 is a structural diagram of a seat belt wearing detection system, in accordance with some embodiments.

The technical solutions in some embodiments of the present disclosure will be described clearly and completely with reference to the accompanying drawings; obviously, the described embodiments are merely some but not all of embodiments of the present disclosure. All other embodiments obtained on the basis of the embodiments of the present disclosure by a person of ordinary skill in the art shall be included in the protection scope of the present disclosure.

In addition, in the present disclosure, the term such as "exemplary" or "for example" is used to present an example, illustration, or explanation. Any embodiment or design solution described herein with "exemplary" or "for example" in the present disclosure is not necessarily to be construed as preferred or advantageous over other embodiments or design solutions. Rather, the use of the term such as "exemplary" or "for example" is intended to present relevant concepts in a specific manner. Unless the context requires otherwise, throughout the description and claims, the term "comprise" and other forms thereof such as the third-person singular form "comprises" and the present participle form "comprising" are construed as an open and inclusive meaning, i.e., "included, but not limited to".

In addition, in the description of the present application, unless otherwise specified, "/" means "or"; for example, A/B may mean A or B. Herein, "and/or" merely describes an association relationship of associated objects, and represents three kinds of relationships; for example, "A and/or B"

represents three situations: only A, both A and B, or only B. In addition, "at least one" means one or more, and "plurality" means two or more.

In addition, the use of the phrase "based on" is meant to be open and inclusive, since a process, step, calculation or other action that is "based on" one or more of the stated conditions or values may, in practice, be based on additional conditions or values beyond those stated.

As mentioned in the background, with the acceleration of urbanization, traffic safety has become a major problem in the field of urban traffic in countries. In order to ensure safe driving as much as possible and reduce the casualty rate in traffic accidents, people in vehicles are required to wear seat belts. However, in the actual driving process of the vehicle, there may be situations where people in the vehicle forget to wear the seat belt, or deliberately do not wear the seat belt, which will bring great safety hazards. Therefore, how to effectively detect the wearing situation of the seat belt is a technical problem that needs to be solved urgently at present.

In the related art, sensors are installed in the seat to detect whether people in the vehicle are wearing seat belts. For example, in a case where the latch plate of the seat belt is inserted into the buckle to be locked, the system automatically confirms that the passenger has fastened the seat belt; otherwise, if it detects that the latch plate is not inserted into the buckle, the system confirms that the driver or passenger is not fasten the seat belt and generates an alarm.

However, in a case where the detection for wearing of seat belt is performed in this manner, and people in the vehicle does not want to wear a seat belt, people may sit directly on the seat with the seat belt is fastened or insert a separately purchased latch plate into the buckle, causing the vehicle system to misinterpret the seat belt as being worn. Therefore, the accuracy of seat belt wearing detection is low, and the driving safety cannot be well protected.

Based on this, embodiments of the present disclosure provide a seat belt wearing detection method, and the method includes: performing face detection on an image to be detected to obtain position information of one or more face detection boxes; recognizing a target face detection box located in a preset seat region from the one or more face detection boxes based on the position information of the one or more face detection boxes; cropping the image to be detected to obtain an target human body image corresponding to the target face detection box based on position information of the target face detection box; segmenting the target human body image to obtain a seat belt region image; and determining whether a person corresponding to the target human body image wears a seat belt based on the seat belt region image.

It will be seen that the core technology is that, in a case where it is detected that a person in a vehicle is located in a preset seat region (that is, in a case where a target face detection box located in a preset seat region is recognized), an image to be detected is segmented to obtain a target human body image of the person, and then whether the corresponding person wears a seat belt is determined according to a seat belt region image in the target human body image. In this way, it does not rely on the sensor in the seat, which may reduce the detection errors due to active human circumvention of detection (e.g., purchasing a separate latch plate and inserting the latch plate into the buckle), so that the accuracy of seat belt wearing detection is improved. As a result, the driving safety is improved. In addition, in a case where the person in the vehicle is located in the preset seat region, whether the person wears the seat belt is detected, which reduces the calculation amount of detection and improves the efficiency of seat belt wearing detection. Moreover, since the seat belt wearing detection is performed in a case where the person is located in the preset seat region, in a case where the picture displayed by the image to be detected includes a person outside the preset seat region, such as a pedestrian outside the car window, it is not detected. Thus, it is possible to avoid the occurrence of false detection results due to the seat belt wearing detection is performed on the person outside the preset seat region.

In order to illustrate the solution provided by the embodiments of the present disclosure more clearly, the application scenario of the seat belt wearing detection method provided by the embodiments of the present disclosure will be firstly described below.

The seat belt wearing detection method provided in the embodiments of the present disclosure is applied to any scene requiring seat belt detection. Optionally, it is used to detect whether the driver or passenger in the vehicle wears the seat belt during the driving of the vehicle. Optionally, it is also extended to other scenarios where seat belt detection exists; for example, in a case where entertainment facilities (e.g., cable cars, roller coasters and other high-altitude entertainment facilities) are used, it is also possible to perform the seat belt wearing detection based on the seat belt wearing detection method provided in the embodiments of the present application. It will be understood that the specific application scenarios of the seat belt wearing detection method are not limited in the present disclosure.

In addition, the seat belt wearing detection method provided in the embodiments of the present disclosure is executed by any device with a processing function, and the execution subject of the seat belt wearing detection method are not limited in the present disclosure. For example, the execution subject may be a server. For another example, the execution subject may be a vehicle-mounted host. For yet another example, the execution subject may be an electronic chip with a processing function, such as a graphics processing unit (GPU). For yet another example, the execution subject may be a mobile phone, a tablet computer, a desktop, a laptop, a handheld computer, a notebook computer, an ultra-mobile personal computer (UMPC), a netbook, a cellular phone, a personal digital assistant (PDA), an augmented reality (AR) device, or a virtual reality (VR) device. Optionally, the execution subject has one or more of a photographing function, a storage function, or a communication function. It will be understood that the specific form of the executing subject of the seat belt wearing detection method are not limited in the present disclosure.

In order to facilitate the understanding of the solution, a possible seat belt wearing detection system is introduced below by taking a vehicle driving scene as an example. The seat belt wearing detection system implements the seat belt wearing detection method provided in the embodiments of the present disclosure.

FIG. 1 shows a seat belt wearing detection system 100, in accordance with some embodiments. Referring to FIG. 1, the seat belt wearing detection system 100 includes an imaging device 101 and a processing device 102. There is a wired or wireless communication connection between the imaging device 101 and the processing device 102. In some embodiments, the seat belt wearing detection system 100 further includes one or more of an alarm device 103, a communication device 104 and a storage device 105.

The imaging device 101 includes at least one camera for capturing and generating at least one frame of original image, for example, for capturing and generating a surveillance video, and the surveillance video includes at least one frame of original image. Further, the imaging device 101 sends the data of the generated original image to the processing device 102 or the storage device 105.

Figure 2:
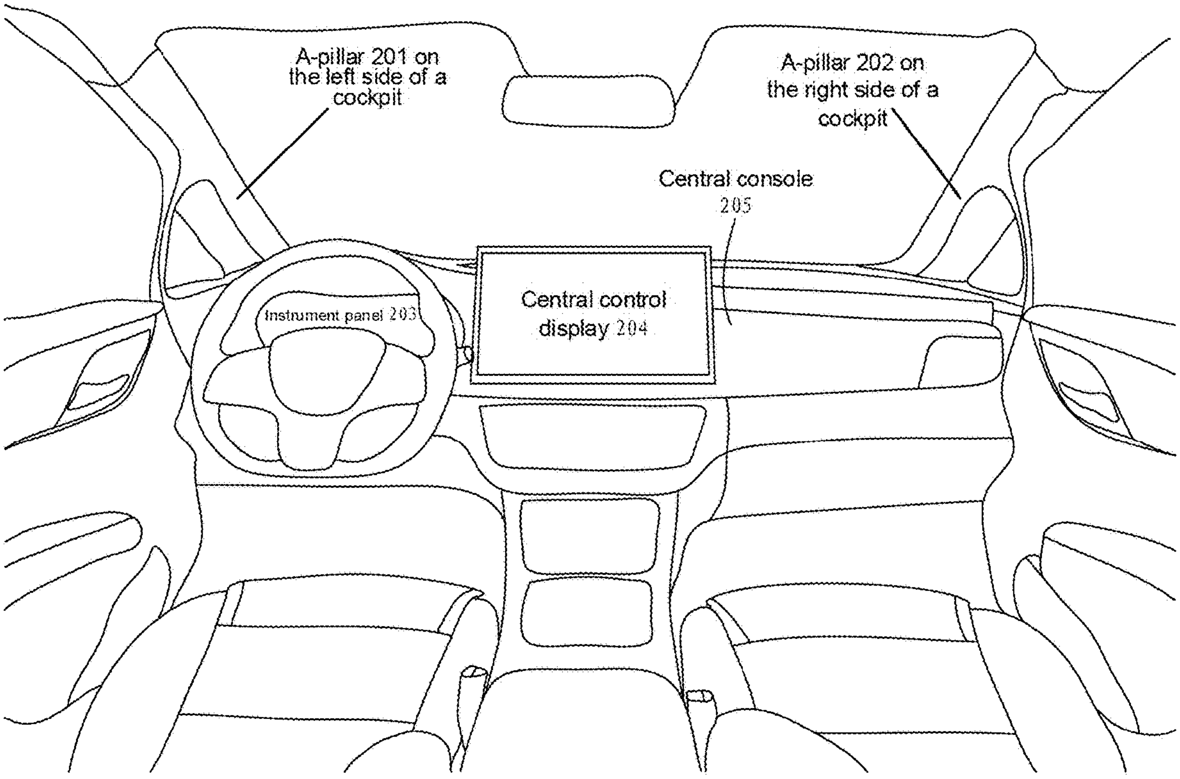
FIG. 2 is a structural diagram of an interior of a vehicle, in accordance with some embodiments.

In some examples, the imaging device 101 is disposed inside the vehicle, and a capturing region of the imaging device 101 includes a preset seat region. For example, referring to the structural diagram of the interior of the vehicle shown in FIG. 2, the imaging device 101 is disposed at least one of following positions: A-pillar(s) of a cockpit (A-pillar 201 on the left side and/or A-pillar 202 on the right side of the cockpit), an instrument panel 203, a reading lamp (not shown in the figure), a central control display 204 or a central console 205. Further, the position of the imaging device 101 is arranged to cause the imaging device 101 shall, as far as possible, not block the driving view. In an example, the imaging device 101 is disposed on an interior trim panel of the A-pillar of the cockpit, and the imaging device 101 is arranged so as not to block the driving field of view near the A-pillar. It will be understood that the installation position of the imaging device 101 is only an example, as long as it is ensured that after the imaging device 101 is installed, the capturing region of the imaging device 101 covers the preset seat region of the vehicle, and the present disclosure does not specifically limit thereto.

In some examples, the imaging device 101 may be one camera, or a collection of multiple cameras. For example, one or more cameras may be arranged at the same position. For another example, the multiple cameras may be respectively arranged at different positions in the vehicle. The number of cameras included in the imaging device 101 is not limited in the embodiments of the present disclosure.

The processing device 102 is used to: receive the original image captured by the imaging device 101, or acquire the original image captured by the imaging device 101 from the storage device 105; and analyze and detect the original image. In some examples, the processing device 102 performs affine transformation on the original image, so that the preset seat region is adjusted to be in the middle of the image after the affine transformation (i.e., the image to be detected) through the affine transformation. In some other examples, the processing device 102 does not perform affine transformation on the original image, but directly use the original image as the image to be detected. In some examples, the processing device 102 is used to determine whether a person in the vehicle wears a seat belt by analysis and detection. Further, the processing device 102 also determines whether an alarm is required according to the analyzed and detected results. For example, if it is detected that the person in the vehicle does not wear the seat belt, the alarm device 103 is notified to perform a corresponding alarm.

In some examples, the processing device 102 is used to perform the seat belt wearing detection method and achieve possible implementations of the seat belt wearing detection method shown below.

In some examples, the processing device 102 implements one or more of the following functions: preprocessing the image to be detected, such as denoising, sharpening, to improve the clarity of the image to be detected; performing face recognition on the image to be detected to obtain a face detection box of each person in the image to be detected; determining whether the person corresponding to the face detection box is located in the preset seat region based on the position of the obtained face detection box in the image to be detected and the position of the preset seat region; segmenting the image to be detected to obtain a target human body image corresponding to the face detection box based on the position of the obtained face detection box; detecting whether there is a seat belt in the image to be detected or the target human body image in the image to be detected; detecting the position of the seat belt in the image to be detected or the target human body image in the image to be detected; determining the slope of the seat belt in the image to be detected or the target body image in the image to be detected based on image recognition; determining whether the person corresponding to the face detection box wears the seat belt in a case where the face detection box detected in the image to be detected is located in the preset seat region; detecting whether the vehicle is in a driving state; in a case where the person in the seat region does not wear the seat belt, instructing the alarm device 103 to give an alarm.

It will be understood that the processing device 102 is any device with processing functions, such as a vehicle host, computer equipment, server, chip system, circuit or other discrete devices, as long as the processing device 102 can realize the seat belt wearing detection method and other possible implementation provided by the embodiments of the present disclosure, which is not specifically limited in the present disclosure.

The alarm device 103 is used to receive an instruction from the processing device 102 and perform a corresponding alarm operation.

In some examples, the alarm device 103 includes one or more of a strobe device, a display device, an audio device or a vibration device. Further, optionally, the alarm device 103 prompts the alarm information in the form of text, animation, strobe, voice, buzzer, or vibration.

The communication device 104 is used to implement at least one of the following functions: interactive communication with other devices, communication with the internet, or communication between various devices in the seat belt wearing detection system 100. For example, the communication device 104 communicates with the user's terminal equipment, so that the alarm device 103 sends the alarm information indicating that the seat belt is not worn to the user's terminal equipment through the communication device 104. For another example, the communication device 104 receives update information from the internet, and the update information is used to update the relevant algorithms of the seat belt wearing detection method provided in the embodiments of the present disclosure. For another example, the communication device 104 implements communication between the imaging device 101 and the processing device 102. For another example, the communication device 104 implements communication between the processing device 102 and the alarm device 103.

The storage device 105 is used to store one or more of the following information: the original image or surveillance video generated by the imaging device 101; the position of the preset seat region; the surveillance video captured by the imaging device 101; the algorithm resources required in the detecting process of the processing device 102; the detected results of the processing device 102, such as the position of the face detection box obtained by face recognition, the semantic information of each pixel in the image, the position of the seat belt, the slope of the seat belt; program instructions for performing the seat belt wearing detection method; or alarm information.

It will be noted that one or more of the aforementioned imaging device 101, processing device 102, alarm device 103, communication device 104, and storage device 105 is arranged independently or integrated. For example, the imaging device 101 and the processing device 102 are integrated arranged. For another example, the processing device 102 and the alarm device 103 are integrated arranged. For another example, the processing device 102 and the storage device 105 are integrated arranged. For another example, the imaging device 101, the processing device 102, and the alarm device 103 are integrated arranged. For another example, the imaging device 101, the processing device 102, the alarm device 103, the communication device 104, and the storage device 105 are integrated arranged. Those skilled in the art perform combined arrangement according to actual needs, which will not be listed here, and will not be specifically limited in the present disclosure.

It will be understood that the various devices of the seat belt wearing detection system shown in FIG. 1 are only examples, and there are other devices in actual applications. For example, although not shown in FIG. 1, the seat belt wearing detection system 100 further includes a power supply device (e.g., a battery and a power management chip) to supply power to various devices of the seat belt wearing detection system 100.

In addition, those of ordinary skill in the art know that the technical solutions provided in the embodiments of the present disclosure are also applicable to similar technical problems. For example, in a case where the seat belt wearing detection method provided by the embodiments of the present disclosure is applied to the seat belt wearing detection in the cable car facility scene, similar to arranging the imaging device 101 inside the vehicle in the vehicle driving scenario, the imaging device 101 is disposed at a position inside a cable car in the cable car facility scenario, so that the capturing region covered by the captured image to be detected includes the preset seat region. It will be understood that the systems and scenarios introduced in the embodiments of the present disclosure are for more clearly illustrating the technical solutions of the embodiments of the present disclosure, and do not constitute limitations on the technical solutions provided by the embodiments of the present disclosure.

The solutions in the embodiments of the present disclosure will be described in detail with reference to the accompanying drawings below.

Figure 3:
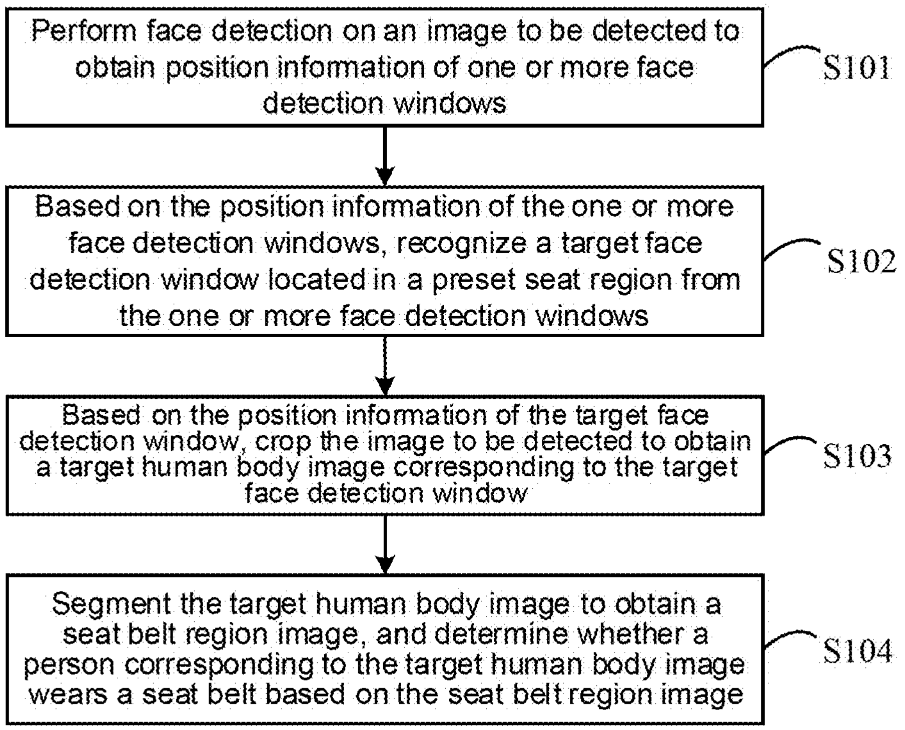
FIG. 3 is a flow diagram of a seat belt wearing detection method, in accordance with some embodiments.

FIG. 3 is a seat belt wearing detection method proposed by the embodiments of the present disclosure. The method provided by the embodiments of the present disclosure will be described in detail by taking an example in which the executing subject is the processing device shown in FIG. 2. As shown in FIG. 3, the seat belt wearing detection method includes following steps S101 to S104.

In S101, face detection is performed on an image to be detected to obtain position information of one or more face detection boxes.

In some embodiments, the image to be detected may be a multi-channel image, for example, a color image such as an RGB image or a YUV image. Alternatively, the image to be detected may be a single-channel image, such as a brightness image. The type of the image to be detected is not specifically limited in the embodiments of the present disclosure.

In some embodiments, the image to be detected is acquired by the processing device from the imaging device. For example, the processing device is connected to the imaging device, and the processing device acquires an original image captured by the imaging device disposed inside the vehicle (e.g., at least one of the A-pillar of a cockpit, the instrument panel, the reading light, the center control display or the central console) and whose capturing region includes a preset seat region.

Optionally, the processing device uses the original image as the image to be detected.

Optionally, after the original image is preprocessed by the processing device, the preprocessed image is used as the image to be detected. For example, in a case where the capturing region of the original image captured by the imaging device includes the preset seat region, affine transformation is performed on the captured original image, so that the preset seat region is located in the middle of the affine transformed image, and the affine transformed image is used as the image to be detected. In this way, the accuracy of detecting the image to be detected (e.g., face detection) in the subsequent process is improved.

It will be understood that, in a case where the processing device is integrated with the imaging device, the processing device acquires the image to be detected from itself.

In some other embodiments, the image to be detected is obtained by the processing device from the storage device. For example, the processing device is connected to the storage device; the storage device stores the original image therein; the processing device reads the original image from the storage device, and uses the original image as the image to be detected, or preprocesses (e.g., affine transformation) the original image and takes it as the image to be detected. As for the processing of the affine transformation, reference is made in the description above, and will not be repeated here.

Optionally, the storage device stores a surveillance video therein, and the surveillance video includes at least one frame of original image; the processing device reads the original image from the storage device frame by frame or skip frame (e.g., reading the original image once every preset number of frames), which is not specifically limited in the present disclosure.

It will be understood that, in a case where the processing device is integrated with the storage device, the processing device acquires the image to be detected from itself.

In some embodiments, the position information of the face detection box includes pixel coordinates of four vertices of the face detection box. For example, the position information of the face detection box is {(x1, y1), (x1, y2), (x2, y1), (x2, y2)}, where (x1, y1) is the pixel coordinates of the upper left vertex of the face detection box in the image to be detected, (x1, y2) is the pixel coordinate of the lower left vertex of the face detection box in the image to be detected, (x2, y1) is the pixel coordinates of the upper right vertex of the face detection box in the image to be detected, and (x2, y2) is the pixel coordinates of the lower right vertex of the face detection box in the image to be detected.

In some embodiments, before face detection is performed on the image to be detected, a first image preprocessing operation is performed on the image to be detected, so as to improve the accuracy of face detection.

Optionally, the first image preprocessing includes resizing. For example, the image to be detected is resized to a preset size, so that the input of the face detection model is an image with the preset size, so as to improve the accuracy of face detection. In an example, the preset size is 1920*1080.

Optionally, the first image preprocessing includes at least one of brightness variation, sharpening, or denoising, so as to improve the definition of the image to be detected.

Optionally, the first image preprocessing includes normalization processing, causing the gradient of the face detection model to converge when performing face detection, so that the speed and accuracy of face detection are improved. For example, the image to be detected is normalized based on Formula (1) or Formula (2) in the following.

$$\text{Output} = \frac{\text{Input} - \text{mean}}{std} \qquad \text{Formula (1)}$$

Input is used to represent a pixel value of a single pixel of the image to be detected, mean is used to represent an average value of pixel values of all the pixels in the image to be detected, std is used to represent a standard deviation of the pixel values of all the pixels in the image to be detected, Output is used to represent a value obtained after normalizing is performed on the pixel value of the single pixel.

$$\text{Output} = \frac{\text{Input} - \text{min}}{\text{max} - \text{min}} \qquad \text{Formula (2)}$$

Input is used to represent the pixel value of a single pixel of the image to be detected, min is used to represent the minimum value of the pixel values of all the pixels in the image to be detected, max is used to represent the maximum value of the pixel values of all the pixels in the image to be detected, Output is used to represent the value obtained after normalizing is performed on the pixel value of the single pixel.

The following will be illustrated by taking an example in which the image to be detected is an RGB image. In a case where the image to be detected is an RGB image, the pixel value Input of a single pixel of the image to be detected is expressed as Input=[ri, gi, bi], where ri is a value of R channel of the pixel, and gi is a value of G channel of the pixel value, bi is a value of B channel of the pixel. In the RGB image, the values of the R channel, G channel, and B channel are all in a range of [0, 255], so that the value of each channel of the pixel value of a single pixel corresponding to Input may be a range of [0, 255].

It will be noted that in a case where some data processing software (e.g.

MATLAB) is used for normalization processing, in order to facilitate calculation, the value of the pixel value Input of a single pixel is mapped from [0,255] to [0, 1] (e.g., multiplying the pixel value of a single pixel by 1/255), and then the substitute the mapped Input into the above Formula (1) or Formula (2) for normalization. It can be understood that after the pixel values of all the pixels in the image to be detected are mapped proportionally, the range of the average value mean and the range of the standard deviation std calculated based on the pixel values of all the pixels are also reduced to 1/255 of the respective values before mapping, so that the normalization results of Formula (1) and Formula (2) are not affected, and the present disclosure does not limit thereto.

In some embodiments, step S101 is implemented as: inputting the image to be detected into a pre-trained face detection model to obtain position information of one or more face detection boxes. For example, the image to be detected is input into the pre-trained face detection model, and in a case where a face is detected in the image to be detected, position information of one or more face detection boxes is output.

The face detection model is a model trained based on deep learning or machine learning. In some examples, the face detection model is a model trained based on the RetinaFace network or the InsightFace network. It will be understood that the network used for deep learning or machine learning is not specifically limited in the embodiments of the present disclosure. As an example, for the training method of the face detection model, reference will be made to the embodiment shown in FIG. 8 below, which will not be repeated here.

In S102, based on the position information of the one or more face detection boxes, a target face detection box located in the preset seat region is recognized from the one or more face detection boxes.

In some embodiments, the preset seat region includes at least one of the following regions: a driver's seat region, a passenger seat region, or a rear seat region of a vehicle. It will be understood that the preset seat region here is an example of a vehicle driving scene. In different application scenarios, different contents are included. For example, in the cable car application scene, the preset seat region is the seat region in the cable car. It will be understood that the specific content of the preset seat region is not limited in the embodiments of the present disclosure.

In some embodiments, the position information of the preset seat region is preset by the processing device. For example, the position information of the preset seat region is the pixel coordinates of the preset seat region in the image to be detected.

In some embodiments, the size information of the preset seat region is preset by the processing device, and is the size information of a preset seat region image corresponding to the preset seat region. For example, the size information of the preset seat region image may be preset as 640*640.

Figure 4:
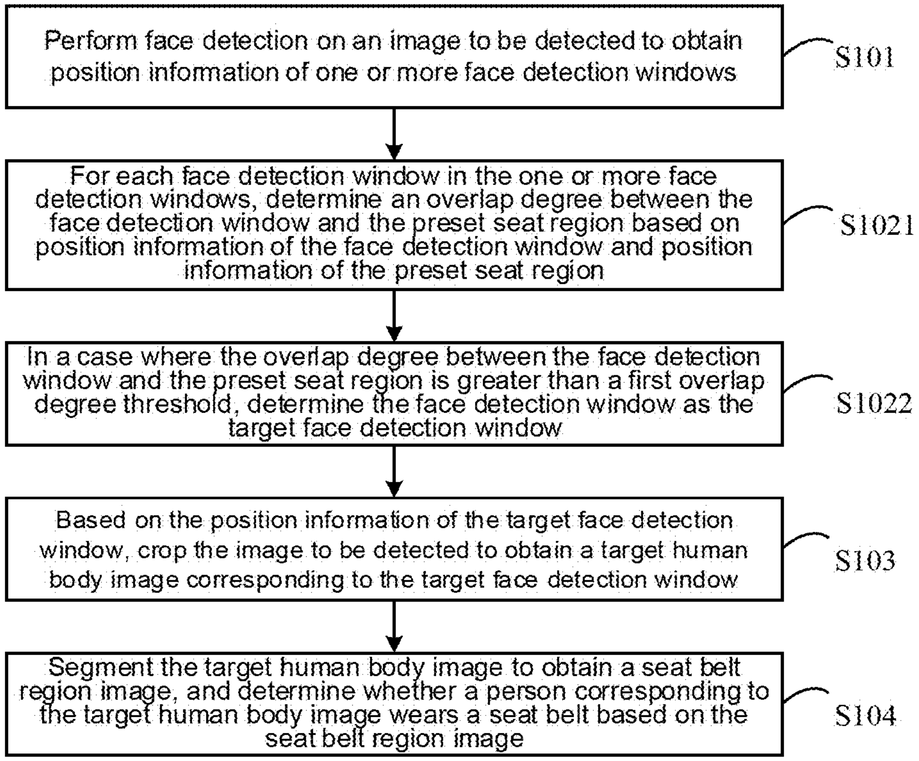
FIG. 4 is another flow diagram of a seat belt wearing detection method, in accordance with some embodiments.

In some examples, as shown in FIG. 4, the step S102 can be implemented as following steps S1021 and S1022.

In S1021, for each face detection box in the one or more face detection boxes, an overlap degree between the face detection box and the preset seat region is determined based on the position information of the face detection box and the position information of the preset seat region.

In some examples, the overlap degree between the face detection box and the preset seat region is an area of the overlapping region between the face detection box and the preset seat region.

Correspondingly, the step S1021 is implemented as: for each face detection box in one or more face detection boxes, determining position information of the overlapping region between the face detection box and the preset seat region based on the position information of the face detection box and the position information of the preset seat region; determining the number of pixels of an overlapping region image based on the position information of the overlapping region; determining the number of pixels of the overlapping region image as the area of the overlapping region; and determining the area of the overlapping region as the overlap degree between the face detection box and the preset seat region.

In some examples, the overlap degree between the face detection box and the preset seat region is a ratio of an area of the overlapping region between the face detection box and the preset seat region to an area of the preset seat region.

Correspondingly, the step S1021 is implemented as: for each face detection box in one or more face detection boxes, determining position information of the overlapping region between the face detection box and the preset seat region based on the position information of the face detection box and the position information of the preset seat region; determining the number of pixels of the overlapping region image based on the position information of the overlapping region; determining the number of pixels of the image of the overlapping region as the area of the overlapping region; determining the number of pixels of an image of the preset seat region based on the position information of the preset seat region; determining the number of pixels of the preset seat region image as the area of the preset seat region; determining the ratio of the area of the overlapping region between the face detection box and the preset seat region to the area of the preset seat region; and determining the ratio of the area of the overlapping region between the face detection box and the preset seat region to the area of the preset seat region as the overlap degree between the face detection box and the preset seat region.

In some examples, the overlap degree between the face detection box and the preset seat region is a ratio of an area of the overlapping region between the face detection box and the preset seat region to an area of the face detection box.

Correspondingly, the step S1021 is implemented as: for each face detection box in one or more face detection boxes, determining position information of the overlapping region between the face detection box and the preset seat region based on the position information of the face detection box and the position information of the preset seat region; determining the number of pixels of an image of the overlapping region based on the position information of the overlapping region; determining the number of pixels of the image of the overlapping region as the area of the overlapping region; determining the number of pixels of an image of the face detection box based on the position information of the face detection box; determining the number of pixels of the image of the face detection box as the area of the face detection box; determining the ratio of the area of the overlapping region between the face detection box and the preset seat region to the area of the face detection box; and determining the ratio of the area of the overlapping region between the face detection box and the preset seat region to the area of the face detection box as the overlap degree between the face detection box and the preset seat region.

In some examples, the overlap degree between the face detection box and the preset seat region is intersection over union between the face detection box and the preset seat region. The intersection over union is also referred to be as a contact ratio. If it is assumed that the overlapping region between the face detection box and the preset seat region is a first region, and an union region between the face detection box and the preset seat region is a second region, the intersection over union between the face detection box and the preset seat region is a ratio of an area of the first region to an area of the second region.

Correspondingly, the step S1021 is implemented as: for each face detection box in the one or more face detection boxes, determining position information of the first region and position information of the second region based on the position information of the face detection box and the position information of the preset seat region; determining the number of pixels of an image corresponding to the first region based on the position information of the first region, and determining the number of pixels of the image corresponding to the first region as the area of the first region; determining the number of pixels of an image corresponding to the second region based on the position information of the second region, and determining the number of pixels of the image corresponding to the second region as the area of the second region; determining the intersection over union between the face detection box and the preset seat region based on the area of the first region and the area of the second region; and determining the intersection over union between the face detection box and the preset seat region as the overlap degree between the face detection box and the preset seat region.

In S1022, in a case where the overlap degree between the face detection box and the preset seat region is greater than a first overlap degree threshold, the face detection box is determined as the target face detection box.

It will be understood that, in a case where the overlap degree between the face detection box and the preset seat region is greater than the first overlap degree threshold, it can be considered that the person corresponding to the face detection box is located in the preset seat region, so that the face detection box is determined as the target face detection box, which facilitates other processing (e.g., detecting wearing of seat belt) in subsequent. In this way, in a case where the detected face detection box is located in the preset seat region, the detection of wearing of seat belt is performed on the person corresponding to the face detection box. Based on this, the calculation amount in the subsequent detection process is reduced.

In S103, based on the position information of the target face detection box, the image to be detected is cropped to obtain a target human body image corresponding to the target face detection box.

Figure 5:
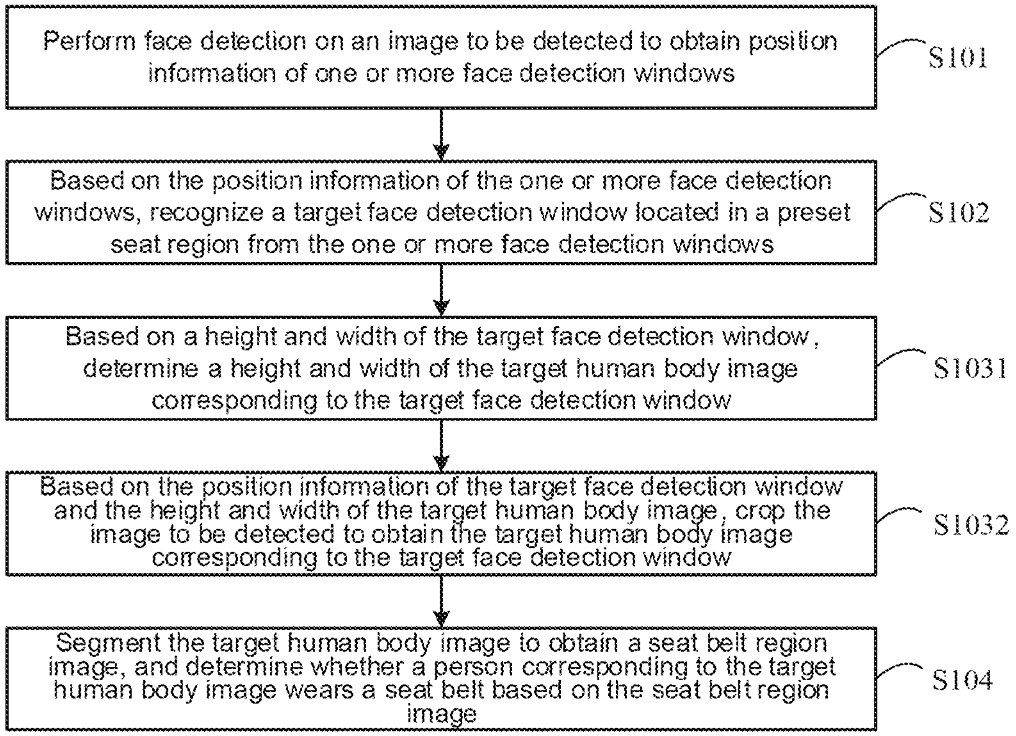
FIG. 5 is yet another flow diagram of a seat belt wearing detection method, in accordance with some embodiments.

In some embodiments, as shown in FIG. 5, the step S103 can be implemented as following steps S1031 and S1032.

In S1031, based on a height and width of the target face detection box, a height and width of the target human body image corresponding to the target face detection box is determined.

A ratio of the height of the target human body image to the height of the target face detection box is a preset first ratio, and a ratio of the width of the target face detection box to the width of the target human body image is a preset second ratio.

In an example, the first ratio is 1.5, and the second ratio is 2. In another example, the first ratio is 2.5, and the second ratio is 2. It will be understood that the first ratio and the second ratio here are only examples, and the specific values thereof are not limited in the present disclosure.

In S1032, based on the position information of the target face detection box and the height and width of the target human body image, the image to be detected is cropped to obtain the target human body image corresponding to the target face detection box.

Figure 6:
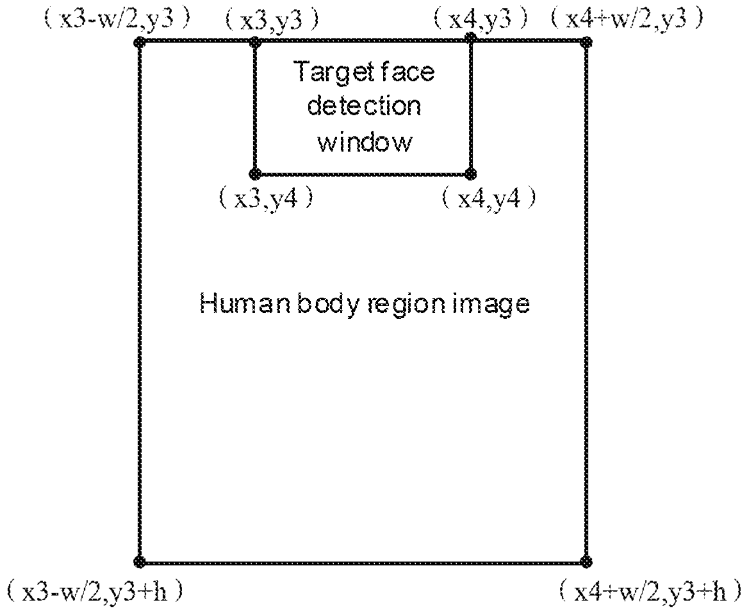
FIG. 6 is a schematic diagram of a method for determining location information of a human body region image, in accordance with some embodiments.

For example, as shown in FIG. 6, if the position information of the target face detection box is {(x3, y3), (x4, y3), (x3, y4), (x4, y4)}, the height of the target human body image is h, and the width of the target human body image is w, then the position information of the target human body image is {(x3−w/2, y3), (x3−w/2, y3+h), (x4+w/2, y3), (x4+w/2, y3+h)}. Furthermore, based on the position information of the target human body image, the image to be detected is segmented to obtain the target human body image corresponding to the target face detection box.

(x3, y3) is the pixel coordinates of the upper left vertex of the target face detection box in the image to be detected, (x4, y3) is the pixel coordinates of the lower left vertex of the target face detection box in the image to be detected, (x3, y4) is the pixel coordinates of the upper right vertex of the target face detection box in the image to be detected, and (x4, y4) is the pixel coordinates of the lower right vertex of the target face detection box in the image to be detected.

It will be understood that the method for determining the position information of the target human body image shown in FIG. 6 is only an example, as long as the target face detection box is substantially located at the upper middle of the target human body image, and the present disclosure does not specifically limit thereto.

In S104, the target human body image is segmented to obtain a seat belt region image, and whether the person corresponding to the target human body image wears a seat belt is determined based on the seat belt region image.

Figure 7:
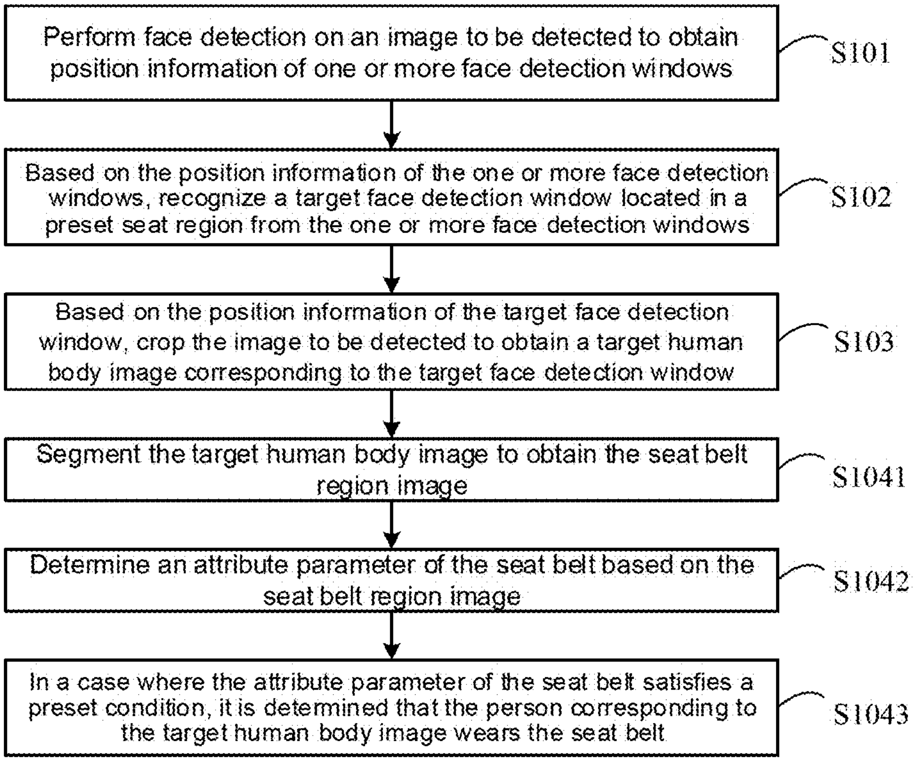
FIG. 7 is yet another flow diagram of a seat belt wearing detection method, in accordance with some embodiments.

In some embodiments, as shown in FIG. 7, the step S104 can be implemented as following steps S1041 to S1043.

In S1041, the target human body image is segmented to obtain the seat belt region image.

In some examples, the above step S1041 is implemented as: inputting the target human body image into the seat belt wearing detection model to obtain the semantic information of each pixel in the target human body image, and the semantic information is used to indicate the object type corresponding to the pixel; and segmenting the target human body image to obtain the seat belt region image based on the semantic information of each pixel.

As an example, the type of the object indicated by the semantic information includes a seat belt.

As an example, considering that during performing the actual segmentation to obtain the seat belt region image, if in the process of performing the segmentation to obtain the seat belt region image, the human body in the target human body image is marked, it is possible to improve the accuracy of the seat belt segmentation to a certain extent. Therefore, the type of the object indicated by the semantic information also includes a human body.

Figure 8:
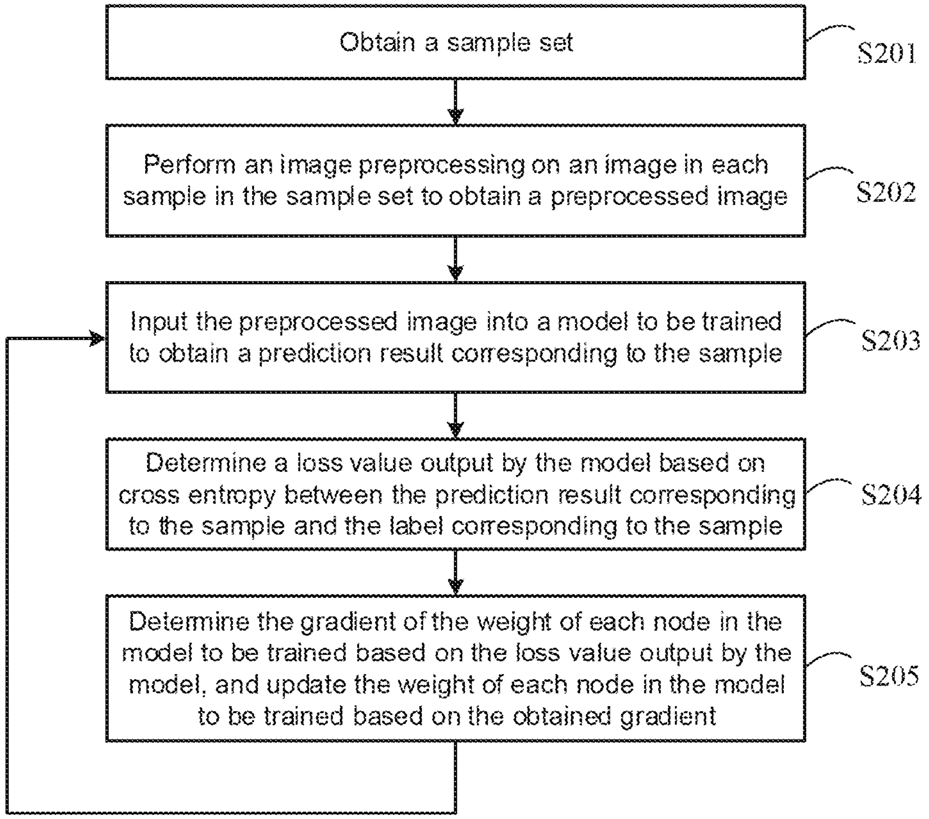
FIG. 8 is a flow diagram of a training method of a model, in accordance with some embodiments.

As an example, the training method of the seat belt wearing detection model still refers to the embodiments shown in FIG. 8 below, which will not be repeated here.

In S1042, an attribute parameter of the seat belt is determined based on the seat belt region image.

In some embodiments, the attribute parameter of the seat belt includes one or more of the following: the slope of the seat belt, which is used to indicate the inclination of the straight line obtained after the fitting process is performed on the seat belt region image with respect to the bottom edge of the target human image; an area of the seat belt region image; an overlap degree between the seat belt region image and the target human body image; and an overlap degree between the seat belt region image and a human body region image that is obtained from segmenting the target human body image.

In some exemplary implementations, the slope of the seat belt is determined in the following manner: performing straight line fitting on the seat belt region image based on Hough transform; and determining the inclination of the straight line obtained after the fitting is performed on the seat belt region image with respect to the bottom edge of the target human image, i.e., the slope of the seat belt. Optionally, before the Hough transform is performed on the seat belt region image, at least one erosion and/or dilation operation is performed on the seat belt region image to remove redundant detail information in the seat belt region image, so that the seat belt region image form a more coherent connected domain to improve the accuracy of the straight line fitting performed in subsequent. It will be understood that the slope of the seat belt is also replaced by the angle between the straight line obtained after the fitting is performed on the seat belt region image and the bottom edge of the target human body image.

In some exemplary embodiments, the area of the seat belt region image is determined in the following manner: determining the number of pixels of the seat belt region image based on the seat belt region image; and determining the number of the pixels of the seat belt region image as the area of the seat belt region image.

In some exemplary implementations, the overlap degree of the seat belt region image and the target human body image is any one of the following: the area of the seat belt region image, or a ratio of the area of the seat belt region image to the area of the target human body image. It will be understood that the area of the seat belt region image is the number of the pixels of the seat belt region image, and the area of the target human body image is the number of the pixels of the target human body image.

In some exemplary implementations, the overlap degree between the seat belt region image and the human body region image is any of the following: an area of the overlapping area between the seat belt region image and the human body region image; a ratio of the area of the overlapping area between the seat belt region image and the human body region image to the area of the human body region image; a ratio of the area of the overlapping area between the seat belt region image and the human body region image to the area of the seat belt region image; or intersection over union between the seat belt region image and the human body region image. It will be understood that, for the convenience of calculation, the area of the image is represented by the number of pixels in the image; for example, the number of pixels in the human body region image is used as the area of the image of the human body region.

The human body region image is obtained in the following manner: inputting the target human body image into the seat belt wearing detection model to obtain the segmented human body region image and seat belt region image; alternatively, detecting the human body contour edge in the target human body image to determine the pixel position of the human body contour edge, and segmenting the target human body image to obtain the human body region image based on the pixel position of the human body contour edge. It will be understood that the method for segmenting the human body region image is not limited in the present disclosure.

In S1043, in a case where the attribute parameter of the seat belt satisfies a preset condition, it is determined that the person corresponding to the target human body image wears the seat belt.

In some embodiments, the preset condition includes a first preset condition, and the first preset condition includes that the slope of the seat belt is within a preset range.

In some embodiments, the preset condition includes a second preset condition, and the second preset condition includes at least one of the following: the area of the seat belt region image exceeding a preset area threshold; the overlap degree between the seat belt region image and the target human body image being greater than or equal to a second overlap degree threshold; or the overlap degree between the seat belt region image and the human body region image being greater than or equal to a third overlap degree threshold.

It will be understood that, in a case where the person wears the seat belt correctly, the seat belt is held diagonally across the chest of the person. Therefore, the area of the seat belt in the target human body image should be large, and the seat belt has a certain angle. Thus, based on the combination of various sub-conditions in the above preset conditions (e.g., the first preset condition and/or the second preset condition), it is accurately determined whether the person wears seat belt.

In an example, in a case where the attribute parameter of the seat belt satisfies the first preset condition, it is determined that the person corresponding to the target human body image wears the seat belt. For example, in a case where the slope of the seat belt is within the preset range, it is determined that the person corresponding to the target human body image wears seat belt.

In another example, in a case where the attribute parameter of the seat belt satisfies the second preset condition, it is determined that the person corresponding to the target human body image wears seat belt. For example, assuming that the second preset condition is that the area of the seat belt region image exceeds a preset area threshold, in the case where the area of the seat belt region image exceeds the preset area threshold, it is determined that the person corresponding to the target human body image wears seat belt.

In yet another example, in a case where the attribute parameter of the seat belt satisfies both the first preset condition and the second preset condition, it is determined that the person corresponding to the target human body image wears seat belt.

For example, assuming that the second preset condition is that the area of the seat belt region image exceeds the preset area threshold, in a case where the slope of the seat belt is within the preset range and the area of the seat belt region image exceeds the preset area threshold, it is determined that the person corresponding to the target human body image wears seat belt.

For another example, assuming that the second preset condition includes that the area of the seat belt region image exceeds a preset area threshold and the overlap degree between the seat belt region image and the target human body image is greater than or equal to the second overlap degree threshold, in a case where the slope of the seat belt is within the preset range, the area of the seat belt region image exceeds the preset area threshold, and the overlap degree between the seat belt region image and the target human body image is greater than or equal to the second overlap degree threshold, it is determined that the person corresponding to the target human body image wears seat belt.

Further, in order to reduce the computation load in the detection process, it is not necessary to determine all the conditions in the preset conditions one by one. For example, assuming that the attribute parameter of the seat belt satisfies both the first preset condition and the second preset condition, it is determined that the person corresponding to the target human body image wears seat belt, it is possible to first determine the attribute parameter of the seat belt satisfies the first preset condition, if no, it is directly determined that the person corresponding to the target human body image does not wear the seat belt, and it is no longer determined whether the attribute parameter of the seat belt satisfies the second preset condition.

As a specific example, the step S1043 is implemented as: determining whether the attribute parameter of the seat belt satisfies the first preset condition; in a case where the attribute parameter of the seat belt does not satisfy the first preset condition, it is determined that the person does not wear the seat belt; in a case where the attribute parameter of the seat belt satisfies the first preset condition, it is determined whether the attribute parameter of the seat belt satisfies the second preset condition; in a case where the attribute parameter of the seat belt does not satisfy the second preset condition, it is determined that the person does not wear the seat belt; in a case where the attribute parameter of the seat belt satisfies the second preset condition, it is determined that the person wears seat belt.

Based on this, the calculation amount in the detection process of the seat belt is reduced. Similarly, it is also possible to first determine whether the attribute parameter of the seat belt satisfies the second preset condition, if no, it is directly determined that the person corresponding to the target human body image does not wear the seat belt, and it is no longer determined whether the attribute parameter of the seat belt satisfies the second preset condition, and it will be understood that the present disclosure does not specifically limit thereto.

The solution provided by the embodiments of the present disclosure does not rely on the sensor in the seat, which reduces the detection errors due to active human circumvention of detection (e.g., purchasing a separate latch plate and inserting the latch plate into the buckle), so that the accuracy of seat belt wearing detection is improved. As a result, the driving safety is improved. In addition, in a case where the person in the vehicle is located in the preset seat region, whether the person wears the seat belt is detected, which reduces the calculation amount of detection and improves the efficiency of seat belt wearing detection. Moreover, since the seat belt wearing detection is performed on the person in the image to be detected and located in the preset seat region, it is possible to prevent from obtaining an erroneous detection result due to that erroneously detecting the wearing of the seat belt on a person outside the preset seat region in a case where there is a person outside the preset seat region (e.g., a pedestrian outside the window of a vehicle) in the image to be detected.

In some embodiments, the embodiments of the present disclosure provide a model training method, which is applicable to the face detection model and/or seat belt wearing detection model mentioned above. As shown in FIG. 8, the model training method includes the following steps S201 to S205.

In S201, a sample set is obtained.

The sample set includes a plurality of samples, each sample corresponds to a frame of image and a label corresponding to the image, and the image is in one-to-one correspondence with the label.

As an example, the content displayed in the image in the sample includes at least one of the following: a cockpit, a driver, a driver's seat, a passenger, and a seat belt. It will be understood that the content here is only an example, and is changed based on changes in actual requirements (for example, in a case where a face detection model is trained, the content displayed in the image in the sample should include a human face), which is not specifically limited in the present disclosure.

As an example, when training a face detection model, the label corresponding to the image is used to mark the position information of the face detection box in the image.

As an example, when training a seat belt wearing detection model, the label corresponding to the image is used to mark the semantic information of each pixel in the image, and the semantic information is used to indicate the type of the object corresponding to the pixel. Optionally, in a case where it is necessary to obtain, by mans of image segmentation, the image of the seat belt region based on the seat belt wearing detection model, the type of the object indicated by the semantic information includes a seat belt. Further, in order to improve the accuracy of the image segmentation of the seat belt area, the type of the object indicated by the semantic information further includes human body. Optionally, in a case where it is necessary to segment the human body region image based on the seat belt wearing detection model, the type of the object indicated by the semantic information includes a human body.

In S202, an image preprocessing is performed on an image in each sample in the sample set to obtain a preprocessed image.

In some examples, the image preprocessing includes a first image preprocessing and/or a second image preprocessing.

The second image preprocessing includes at least one of the following: random cropping, left-right flipping, cutmix, or color jetter. Optionally, it is possible to improve the generalization of the face detection model in a case of different sizes of pictures based on the processing of random cropping. Optionally, it is possible to improve the generalization of the face detection model in a case where the person wearing the seat belt in the image is located in the seat region in different directions based on the processing of left-right flipping. Optionally, it is possible to improve the generalization of images in different mosaic situations based on the processing of cutmix. Optionally, it is possible to improve the generalization of images in different colors based on the processing of color jetter, such as random adjustment of brightness, saturation, or contrast.

For the first image preprocessing, reference is made to the above description, which will not be repeated here.

In S203, the preprocessed image is input into a model to be trained to obtain a prediction result corresponding to the sample.

Optionally, the size of the preprocessed image is a preset size.

Optionally, when training the face detection model, the prediction result corresponding to the sample is the position information of a predicted face detection box.

Optionally, when training the seat belt wearing detection model, the prediction result corresponding to the sample includes predicted semantic information of each pixel.

Optionally, when training the face detection model, the model to be trained is established based on the RetinaFace network; when training the seat belt wearing detection model, the model to be trained is established based on the Deeplabv3+ network. It will be understood that the network used in the training process of the model (e.g., face detection model and/or seat belt wearing detection model) is not specifically limited in present disclosure.

It will be understood that the above step S202 is optional. In a case where the step S202 is not performed, the step S203 is implemented as: inputting the image in the sample to the model to be trained to obtain the prediction result corresponding to the sample.

In S204, a loss value output by the model is determined based on cross entropy between the prediction result corresponding to the sample and the label corresponding to the sample.

In some examples, the cross entropy between the prediction result corresponding to the sample and the label corresponding to the sample satisfies the following Formula (3).

$$\text{loss} = \text{label} \cdot \log\frac{1}{1+e^{-x}} + (1-\text{label}) \cdot \log\left(1 - \frac{1}{1+e^{-x}}\right) \quad \text{Formula (3)}$$

loss is used to represent the cross entropy between the prediction result corresponding to the sample and the label corresponding to the sample, label is used to represent the label corresponding to the sample, and x is used to represent the prediction result corresponding to the sample.

In S205, the gradient of the weight of each node in the model to be trained is determined based on the loss value output by the model, and the weight of each node in the model to be trained is updated based on the obtained gradient.

In this way, the above step S203 to step S205 are repeated until the preset training termination condition is satisfied, and a trained model is obtained.

Figure 9:
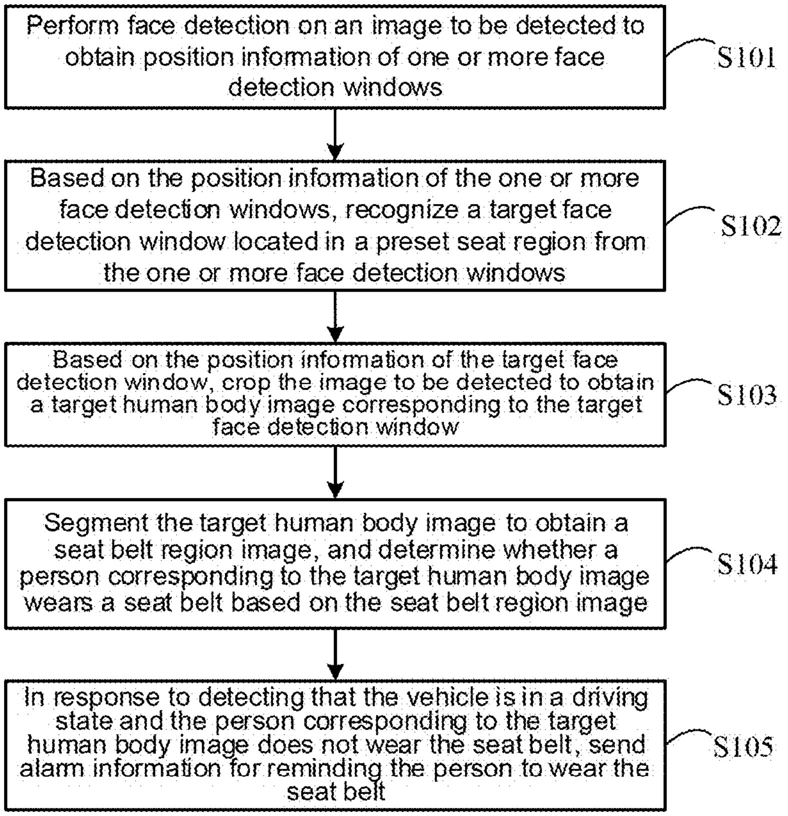
FIG. 9 is yet another flow diagram of a seat belt wearing detection method, in accordance with some embodiments.

In some embodiments, in a case where it is detected that the person corresponding to the target human body image does not wear the seat belt, it is also possible to perform an alarm operation. For example, as shown in FIG. 9, after the step S104, the method further includes step S105.

In S105, in response to detecting that the vehicle is in a driving state and the person corresponding to the target human body image does not wear the seat belt, alarm information for reminding the person to wear the seat belt is send out.

In some embodiments, in response to detecting that the vehicle is in a driving state and the person corresponding to the target human body image does not wear a seat belt, the alarm information is prompted in the form of text, animation, strobe, voice, buzzer, or vibration.

In some embodiments, the processing device and the alarm device are independently arranged and connected, and the step S105 is implemented as: in response to detecting that the vehicle is in a driving state and the person corresponding to the target human body image does not wear the seat belt, an alarm information for reminding the person to wear the seat belt is send out by the processing device through the alarm device.

In some embodiments, the processing device is integrated with the alarm device, and the step S105 is implemented as: in response to detecting that the vehicle is in a driving state and the person corresponding to the target human body image does not wear the seat belt, an alarm information for reminding the person to wear the seat belt is send out.

In some embodiments, after the seat belt wearing detection function is turned on, the processing device acquires the image to be detected and executes the seat belt wearing detection method shown in the embodiments of the present disclosure.

Optionally, the processing device confirms that the seat belt wearing detection function is turned on.

Optionally, in response to receiving an instruction to turn on the seat belt wearing detection function, the processing device turns on the seat belt wearing detection function.

For ease of understanding, an example will be shown below.

Figure 10:
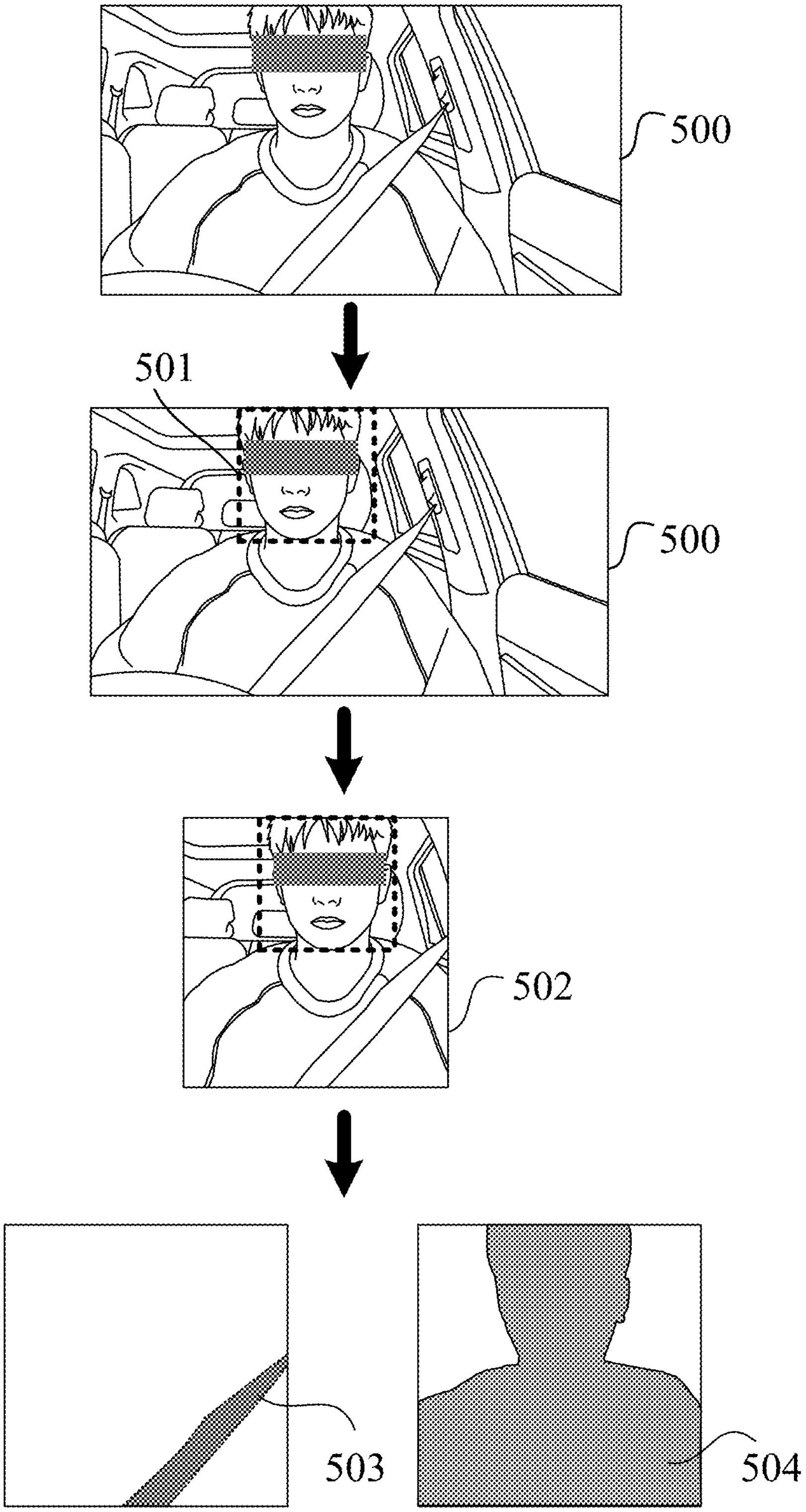
FIG. 10 is yet another flow diagram of a seat belt wearing detection method, in accordance with some embodiments.

Referring to FIG. 10, after acquiring an image to be detected 500, the processing device performs face detection on the image to be detected 500 to obtain position information of a face detection box 501 in the image to be detected 500.

After it is determined that the face detection box 501 is located in the preset seat region based on the position information of the face detection box 501, the face detection box 501 is determined as a target face detection box.

Based on the position information of the target face detection box (i.e., the face detection box 501), the image to be detected 500 is cropped to obtain a target human body image 502 corresponding to the target face detection box 500 according to a first ratio of 2 and a second ratio of 2.5, so that a height of the target human body image 502 is twice a height of the face detection box 501, and a width of the target human body image 502 is 2.5 times a width of the face detection box 501.

The target human body image 502 is segmented to obtain a seat belt region image 503 and a human body region image 504.

A straight-line fitting is performed on the seat belt region image 503 by Hough transform to obtain the slope of the seat belt.

An overlap degree between the seat belt region image 503 and the human body region image 504 is calculated.

In a case where the slope of the seat belt is within a preset range, and the overlap degree between the seat belt region image 503 and the human body region image 504 is greater than or equal to a third overlap degree threshold, it is determined that the person corresponding to the target human body image does not wear the seat belt.

Further, in a case where it is detected that the person corresponding to the target human body image does not wear the seat belt and the vehicle is in a driving state, alarm information for reminding the person to wear the seat belt is sent.

It will be seen that the foregoing descriptions mainly introduce the solutions provided by the embodiments of the present disclosure from perspective of the method. In order to achieve the above functions, embodiments of the present disclosure provide corresponding hardware structures and/or software modules for performing various functions. A person skilled in the art will be easy to realize that, by combining modules and algorithm steps of the embodiments described in the embodiments disclosed herein, the embodiments of the present disclosure is implemented through hardware or a combination of hardware and computer software. Whether a certain function is performed by the hardware or a way of driving hardware by the computer software depends on a specific application and a design constraint of a technical scheme. A skilled person uses different methods for each specific application to implement the described functions, but such implementation should not be considered beyond the scope of the present disclosure.

Figure 11:
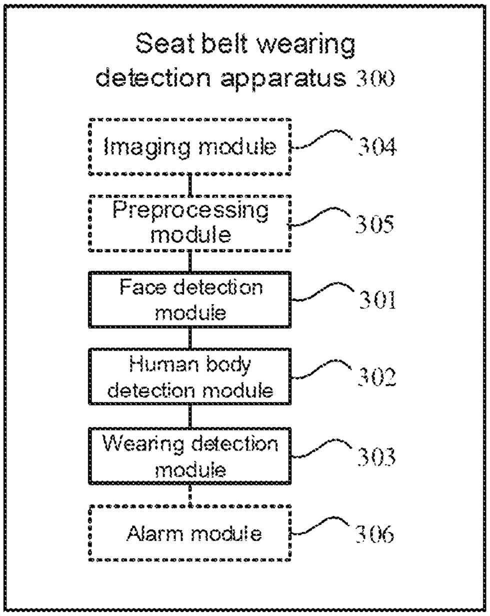
FIG. 11 is a structural diagram of a seat belt wearing detection apparatus, in accordance with some embodiments.

As shown in FIG. 11, embodiments of the present application provide a seat belt wearing detection apparatus, which is used to implement the above seat belt wearing detection method and any possible implementation thereof. The seat belt wearing detection apparatus 300 includes a face detection module 301, a human body detection module 302, and a wearing detection module 303. The face detection module 301 is used to: perform face detection on the image to be detected to obtain the position information of one or more face detection boxes; recognize the target face detection box within the preset seat region based on the position information of one or more face detection boxes. The human body detection module 302 is used to crop the image to be detected to obtain the target human body image corresponding to the target face detection box based on the position information of the target face detection box. The wearing detection module 303 is used to segment the target human body image to obtain the seat belt region image, and determine whether the person corresponding to the target human body image wears a seat belt based on the seat belt region image.

In some embodiments, the above-mentioned face detection module 301 is used to: determine, for each face detection box in the one or more face detection boxes, an overlap degree between the face detection box and the preset seat region based on the position information of the face detection box and the position information of the preset seat region; determine the face detection box as the target face detection box in a case where the overlap degree between the face detection box and the preset seat region is greater than or equal to a first overlap degree threshold.

In some embodiments, the wearing detection module 303 is used to: determine the attribute parameter of the seat belt based on the seat belt region image, the attribute parameter of the seat belt including the slope of the seat belt used to indicate the inclination of the straight line obtained after the fitting is performed on the seat belt region image with respect to the bottom edge of the target human image; determine the person corresponding to the target human body image wears the seat belt in a case where the attribute parameter of the seat belt satisfies the preset condition, the preset condition including a first preset condition, and the first preset condition including that the slope of the seat belt is within the preset range.

In some embodiments, the wearing detection module 303 is further used to segment the target human body image to obtain the human body region image. The attribute parameter of the seat belt further includes at least one of the following: an area of the seat belt region image, an overlap degree between the seat belt region image and target human body image, and an overlap degree between the seat belt region image and the human body area image.

In some embodiments, the preset condition further includes a second preset condition, and the second preset condition includes at least one of the following: the area of the seat belt region image exceeding a preset area threshold; the overlap degree between the seat belt region image and the target human body image being greater than or equal to a second overlap degree threshold; or the overlap degree between the seat belt region image and the human body region image being greater than or equal to a third overlap degree threshold.

In some embodiments, the wearing detection module 303 is used to: determine whether the attribute parameter of the seat belt satisfies the first preset condition; determine, in a case where the attribute parameter of the seat belt does not satisfy the first preset condition, that the person corresponding to the target human body image does not wear seat belt; determine, in a case where the attribute parameter of the seat belt satisfies the first preset condition, whether the attribute parameter of the seat belt satisfies the second preset condition; determine, in a case where the attribute parameter of the seat belt does not satisfy the second preset condition, that the person corresponding to the target human body image does not wear seat belt; determine, in a case where the attribute parameter of the seat belt satisfies the second preset condition, that the person corresponding to the target human body image wears seat belt.

In some embodiments, the human body detection module 302 is used to: determine a height and width of the target human body image corresponding to the target face detection box based on the height and width of the target face detection box, a ratio of the height of the target human body image to the height of the target face detection box is a preset first ratio, a ratio of the width of the target face detection box to the width of the target human body image is a preset second ratio; crop the image to be detected to obtain the target human body image corresponding to the target face detection box based on the position information of the target face detection box and the height and width of the human body region image.

In some embodiments, the above apparatus further includes an imaging module 304 and a preprocessing module 305. The imaging module 304 is used to acquire an original image; the imaging module 304 is disposed inside the vehicle and the capturing region of the imaging module 304 includes a preset seat region. The preprocessing module 305 is used to perform affine transformation on the original image to obtain the image to be detected; the preset seat region is located in the middle of the image to be detected.

In some embodiments, the imaging module 304 is arranged at least one of the following positions: the A-pillar of the cockpit, the instrument panel, the reading light, the center control display or the central console.

In some embodiments, the wearing detection module 303 is used to: input the target human body image into the seat belt wearing detection model to obtain the semantic information of each pixel in the target human body image, the semantic information being used to indicate the type of the object corresponding to the pixel; and segment the target human body image to obtain the seat belt region image based on the semantic information of each pixel.

In some embodiments, the face detection module 301 is used to input the image to be detected into the face detection model to obtain the position information of one or more face detection boxes.

In some embodiments, the seat belt wearing detection apparatus further includes an alarm module 306, and the alarm module 306 is used to send, in a case where it is detected that the person corresponding to the target human body image does not wear the seat belt and the vehicle is in a driving state, an alarm information for reminding the person to wear the seat belt.

It will be noted that, the division of the modules in FIG. 11 is schematic, and is only a logical function division, and there are other ways to divide the modules in actual implementation. For example, two or more functions are integrated into one processing module. The integrated modules are implemented in the form of hardware or software functional modules.

Figure 12:
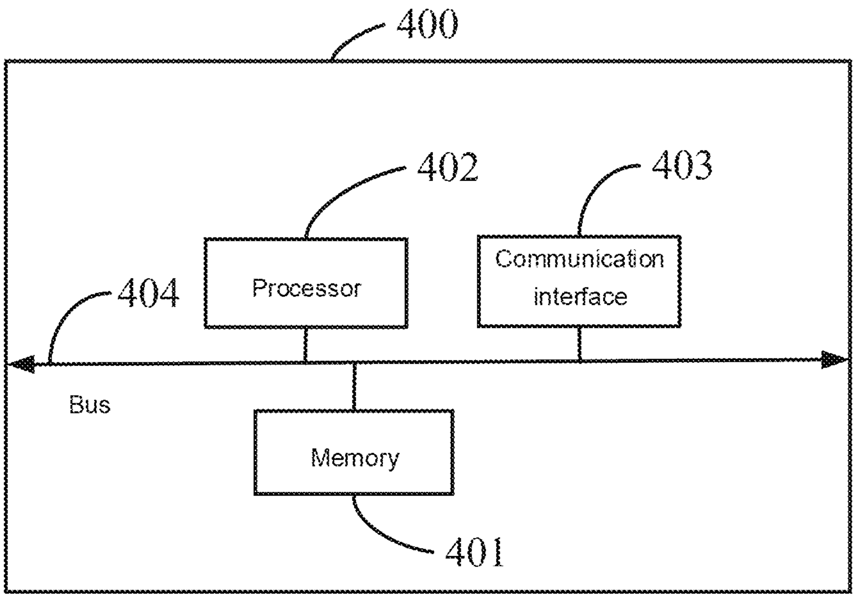
FIG. 12 is a structural diagram of an electronic device, in accordance with some embodiments.

In addition, embodiments of the present disclosure provide an electronic device involved in the foregoing embodiments. As shown in FIG. 12, the electronic device 400 includes a processor 402 and a bus 404. Optionally, the electronic device further includes a memory 401; optionally, the electronic device further includes a communication interface 403.

The processor 402 implements or executes various illustrative logical blocks, modules and circuits described in content of the present disclosure. The processor 402 is a central processor or any other general-purpose processor, a digital signal processor, an application specific integrated circuit, a field programmable gate array, or any other programmable logic device, a transistor logic device, a hardware component, or any combination of the above. It can implement or execute various illustrative logical blocks, modules and circuits described in content of the present disclosure. The processor 402 is also a combination that implements computing functions, for example, a combination including one or more microprocessors, a combination of a DSP and a microprocessor, or the like.

The communication interface 403 is used to connect to other devices through the communication network. The communication network may be Ethernet, wireless access network, wireless local area network (WLAN) or the like.

The memory 401 may be, but is not limited to, a read-only memory (ROM) or a static storage device of any other type that can store static information and instructions, a random access memory (RAM), or a dynamic storage device of any other type that can store information and instructions, or an electrically erasable programmable read-only memory (EEPROM), a magnetic disk storage medium or any other magnetic disk storage device, or any other medium that can be used to carry or store desired program codes with instructions or data and can be accessed by a computer.

As a possible implementation, the memory 401 may exist independently of the processor 402, and the memory 401 may be connected to the processor 402 through the bus 404, and is used for storing instructions or program codes. When calling and executing the instructions or program codes stored in the memory 401, the processor 402 may implement the seat belt wearing detection method provided in the embodiments of the present disclosure.

In another possible implementation, the memory 401 may be integrated with the processor 402.

The bus 404 may be an extended industry standard architecture (EISA) bus or the like. The bus 404 may be divided into address bus, data bus, control bus and so on. For ease of representation, only one bold line is used in FIG. 12, but it does not mean that there is only one bus or one type of bus.

From description of the above embodiments, those skilled in the art will clearly understand that, for convenience and brevity of description, an example is only given according to the above division of functional modules. In practical applications, the above functions are allocated to different functional modules as needed. That is, an internal structure of the device is divided into different functional modules to perform all or part of the functions described above.

Some embodiments of the present disclosure provide a computer-readable storage medium (for example, a non-transitory computer-readable storage medium), the computer-readable storage medium has stored a computer program instruction, and the computer program instruction, when executed on a computer (for example, an electronic device or a seat belt wearing detection apparatus), causes the computer to perform the seat belt wearing detection method as described in any of the above embodiments.

For example, the computer-readable storage medium may include, but is not limited to, a magnetic storage device (e.g., a hard disk, a floppy disk or a magnetic tape), an optical disk ((e.g., a compact disk (CD), a digital versatile disk (DVD)), a smart card and a flash memory device (e.g., an erasable programmable read-only memory (EPROM), a card, a stick or a key driver). The various computer-readable storage media described in present disclosure may represent one or more devices and/or other machine-readable storage media for storing information. The term "machine-readable storage media" may include, but are not limited to, wireless channels and various other media capable of storing, containing, and/or carrying instruction(s) and/or data.

Some embodiments of the present disclosure provide a computer program product, which is stored on, for example, a non-transitory computer-readable storage medium. The computer program product includes a computer program instruction, and when the computer program instructions are executed on a computer (for example, an electronic device or a seat belt wearing detection apparatus), the computer program instructions cause the computer to perform the seat belt wearing detection method according to the foregoing embodiments.

Some embodiments of the present disclosure provide a computer program. When the computer program is executed on a computer (for example, an electronic device or a seat belt wearing detection apparatus), the computer program causes the computer to perform the seat belt wearing detection method according to the foregoing embodiments.

Beneficial effects of the non-transitory computer-readable storage medium, computer program product and computer program described above are the same as the beneficial effects of the seat belt wearing detection method described in some of the above embodiments, which will not be repeated here.

Although the present disclosure has been described in conjunction with various embodiments herein, other variations of the disclosed embodiments may be understood and realized by a person skilled in the art by reviewing the accompanying drawings, the disclosure, and the appended claims during the implementation of the present disclosure for which protection is claimed. In the claims, the terms "comprising" does not exclude other components or steps, and "a" or "an" does not exclude a case of multiple. A single processor or other unit may achieve the functions of several items recited in the claims. The mere fact that certain solutions are recited in mutually different dependent claims does not indicate that these solutions cannot be combined to good effect.

Although the present disclosure has been described in conjunction with specific features and embodiments thereof, it will be apparent that various modifications and combinations can be made thereto without departing from the spirit and scope of the present disclosure. Accordingly, the specification and drawings are merely illustrative of the present disclosure as defined by the appended claims and are deemed to cover any and all modifications, variations, combinations or equivalents within the scope of the present disclosure. Obviously, those skilled in the art can make various changes and modifications to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

The above are only specific embodiments of the present disclosure, but the scope of protection of the present disclosure is not limited thereto, and any variations or replacements within the technical scope of the present disclosure shall fall within the protection scope of the present disclosure. Therefore, the protection scope of the present disclosure shall be subject to the protection scope of the claims.

What is claimed is:

1. A seat belt wearing detection method, comprising:

performing face detection on an image to be detected to obtain position information of one or more face detection boxes;

recognizing a target face detection box located in a preset seat region from the one or more face detection boxes based on the position information of the one or more face detection boxes;

cropping the image to be detected to obtain a target human body image corresponding to the target face detection box based on position information of the target face detection box; and segmenting the target human body image to obtain a seat belt region image; and determining whether a person corresponding to the target human body image wears a seat belt based on the seat belt region image;

wherein determining whether the person corresponding to the target human body image wears the seat belt based on the seat belt region image, includes:

determining an attribute parameter of the seat belt based on the seat belt region image; the attribute parameter of the seat belt including a slope of the seat belt, and the slope of the seat belt being used to indicate an inclination of a straight line obtained after a fitting process is performed on the seat belt region image with respect to a bottom edge of the target human image; and determining the person corresponding to the target human body image wears the seat belt in a case where the attribute parameter of the seat belt satisfies a preset condition; the preset condition including a first preset condition, and the first preset condition including that the slope of the seat belt is within a preset range.

2. The method according to claim 1, wherein recognizing the target face detection box located in the preset seat region from the one or more face detection boxes based on the position information of the one or more face detection boxes, includes:

determining, for each face detection box in the one or more face detection boxes, an overlap degree between the face detection box and the preset seat region based on position information of the face detection box and position information of the preset seat region; and determining the face detection box as the target face detection box in a case where the overlap degree between the face detection box and the preset seat region is greater than a first overlap degree threshold.

3. The method according to claim 1, wherein the method further comprises: segmenting the target human body image to obtain a human body region image; wherein the attribute parameter of the seat belt further includes at least one of the following: an area of the seat belt region image, an overlap degree between the seat belt region image and the target human body image, and an overlap degree between the seat belt region image and the human body region image.

4. The method according to claim 3, wherein the preset condition further includes a second preset condition, and the second preset condition includes at least one of the following:

the area of the seat belt region image exceeding a preset area threshold;

the overlap degree between the seat belt region image and the target human body image being greater than or equal to a second overlap degree threshold; or the overlap degree between the seat belt region image and the human body region image being greater than or equal to a third overlap degree threshold.

5. The method according to claim 4, wherein determining the person corresponding to the target human body image wears the seat belt in the case where the attribute parameter of the seat belt satisfies the preset condition, includes:

determining whether the attribute parameter of the seat belt satisfies the first preset condition;

in a case where the attribute parameter of the seat belt does not satisfy the first preset condition, determining that the person corresponding to the target human body image does not wear the seat belt;

in a case where the attribute parameter of the seat belt satisfies the first preset condition, determining whether the attribute parameter of the seat belt satisfies the second preset condition;

in a case where the attribute parameter of the seat belt does not satisfy the second preset condition, determining that the person corresponding to the target human body image does not wear the seat belt; and in a case where the attribute parameter of the seat belt satisfies the second preset condition, determining that the person corresponding to the target human body image wears the seat belt.

6. The method according to claim 1, wherein cropping the image to be detected to obtain the target human body image corresponding to the target face detection box based on the position information of the target face detection box, includes:

determining a height and width of the target human body image corresponding to the target face detection box based on a height and width of the target face detection box;

wherein a ratio of the height of the target human body image to the height of the target face detection box is a preset first ratio, and a ratio of the width of the target face detection box to the width of the target human body image is a preset second ratio; and cropping the image to be detected to obtain the target human body image corresponding to the target face detection box based on the position information of the target face detection box and the height and width of the human body region image.

7. The method according to claim 1, wherein the method further comprises:

acquiring an original image captured by an imaging device disposed inside a vehicle and whose capturing region including the preset seat region; and performing affine transformation on the original image to obtain the image to be detected, wherein the preset seat region is located in the middle of the image to be detected.

8. The method according to claim 1, wherein segmenting the target human body image to obtain the seat belt region image, includes:

inputting the target human body image into a seat belt wearing detection model to obtain semantic information of each pixel in the target human body image, the semantic information being used to indicate a type of an object corresponding to the pixel; and segmenting the target human body image to obtain the seat belt region image based on the semantic information of each pixel; and performing face detection on the image to be detected to obtain the position information of the one or more face detection boxes, includes:

inputting image to be detected into a face detection model to obtain the position information of the one or more face detection boxes.

9. An electronic device, comprising: a processor and a memory for storing instructions executed by the processor; wherein the processor is configured to execute the instructions to cause the electronic device to perform the method according to claim 1.

10. The electronic device according to claim 9, wherein the electronic device further comprises an imaging device, wherein the imaging device and one of the processor and memory have a data connection therebetween, and the imaging device is used to capture an original image; the imaging device is disposed inside a vehicle, and a capturing region of the imaging device includes a preset seat region;

the processor is further configured to perform affine transformation on the original image to obtain an image to be detected; the preset seat region is located in the middle of the image to be detected.

11. The electronic device according to claim 10, wherein the imaging device is provided at at least one of following locations: A-pillar of a cockpit, an instrument panel, a reading light, a center control display or a central console.

12. The electronic device according to claim 9, wherein the processor is configured to execute the instructions to cause the electronic device to perform:

determining, for each face detection box in the one or more face detection boxes, an overlap degree between the face detection box and the preset seat region based on position information of the face detection box and position information of the preset seat region; and determining the face detection box as the target face detection box in a case where the overlap degree between the face detection box and the preset seat region is greater than a first overlap degree threshold.

13. The electronic device according to claim 9, wherein the processor is configured to execute the instructions to cause the electronic device to further perform:

segmenting the target human body image to obtain a human body region image; wherein the attribute parameter of the seat belt further includes at least one of the following: an area of the seat belt region image, an overlap degree between the seat belt region image and the target human body image, and an overlap degree between the seat belt region image and the human body region image; and the preset condition further includes a second preset condition, and the second preset condition includes at least one of the following: the area of the seat belt region image exceeding a preset area threshold, the overlap degree between the seat belt region image and the target human body image being greater than or equal to a second overlap degree threshold, or the overlap degree between the seat belt region image and the human body region image being greater than or equal to a third overlap degree threshold.

14. The electronic device according to claim 13, wherein the processor is configured to execute the instructions to cause the electronic device to perform:

determining whether the attribute parameter of the seat belt satisfies the first preset condition;

determining that the person corresponding to the target human body image does not wear the seat belt in a case where the attribute parameter of the seat belt does not satisfy the first preset condition;

determining whether the attribute parameter of the seat belt satisfies the second preset condition in a case where the attribute parameter of the seat belt satisfies the first preset condition;

determining that the person corresponding to the target human body image does not wear the seat belt in a case where the attribute parameter of the seat belt does not satisfy the second preset condition; and determining that the person corresponding to the target human body image wears the seat belt in a case where the attribute parameter of the seat belt satisfies the second preset condition.

15. The electronic device according to claim 9, wherein the processor is configured to execute the instructions to cause the electronic device to perform:

determining a height and width of the target human body image corresponding to the target face detection box based on a height and width of the target face detection box; wherein a ratio of the height of the target human body image to the height of the target face detection box is a preset first ratio, and a ratio of the width of the target face detection box to the width of the target human body image is a preset second ratio; and cropping the image to be detected to obtain the target human body image corresponding to the target face detection box based on the position information of the target face detection box and the height and width of the human body region image.

16. The electronic device according to claim 9, wherein the processor is configured to execute the instructions to cause the electronic device to perform:

segmenting the target human body image to obtain the seat belt region image, includes:

inputting the target human body image into a seat belt wearing detection model to obtain semantic information of each pixel in the target human body image, the semantic information being used to indicate a type of an object corresponding to the pixel; and segmenting the target human body image to obtain the seat belt region image based on the semantic information of each pixel; and performing face detection on the image to be detected to obtain the position information of the one or more face detection boxes, includes:

inputting image to be detected into a face detection model to obtain the position information of the one or more face detection boxes.

17. A non-transitory computer-readable storage medium, wherein the non-transitory computer-readable storage medium has stored computer instructions that, when run on an electronic device, cause the electronic device to perform the method according to claim 1.

18. A seat belt wearing detection method, comprising:

performing face detection on an image to be detected to obtain position information of one or more face detection boxes;

recognizing a target face detection box located in a preset seat region from the one or more face detection boxes based on the position information of the one or more face detection boxes;

cropping the image to be detected to obtain a target human body image corresponding to the target face detection box based on position information of the target face detection box; and segmenting the target human body image to obtain a seat belt region image; and determining whether a person corresponding to the target human body image wears a seat belt based on the seat belt region image; and the method further comprising:

acquiring an original image captured by an imaging device disposed inside a vehicle and whose capturing region including the preset seat region; and performing affine transformation on the original image to obtain the image to be detected, wherein the preset seat region is located in the middle of the image to be detected.

19. A seat belt wearing detection method, comprising:

performing face detection on an image to be detected to obtain position information of one or more face detection boxes;

recognizing a target face detection box located in a preset seat region from the one or more face detection boxes based on the position information of the one or more face detection boxes;

cropping the image to be detected to obtain a target human body image corresponding to the target face detection box based on position information of the target face detection box; and segmenting the target human body image to obtain a seat belt region image; and determining whether a person corresponding to the target human body image wears a seat belt based on the seat belt region image;

wherein segmenting the target human body image to obtain the seat belt region image, includes:

inputting the target human body image into a seat belt wearing detection model to obtain semantic information of each pixel in the target human body image, the semantic information being used to indicate a type of an object corresponding to the pixel; and segmenting the target human body image to obtain the seat belt region image based on the semantic information of each pixel; and performing face detection on the image to be detected to obtain the position information of the one or more face detection boxes, includes:

inputting image to be detected into a face detection model to obtain the position information of the one or more face detection boxes.

* * * * *